July 6, 1943.　　　　R. E. BITNER　　　　2,323,787
REFLECTING LENS MOUNT
Filed Dec. 13, 1941　　　　2 Sheets-Sheet 1
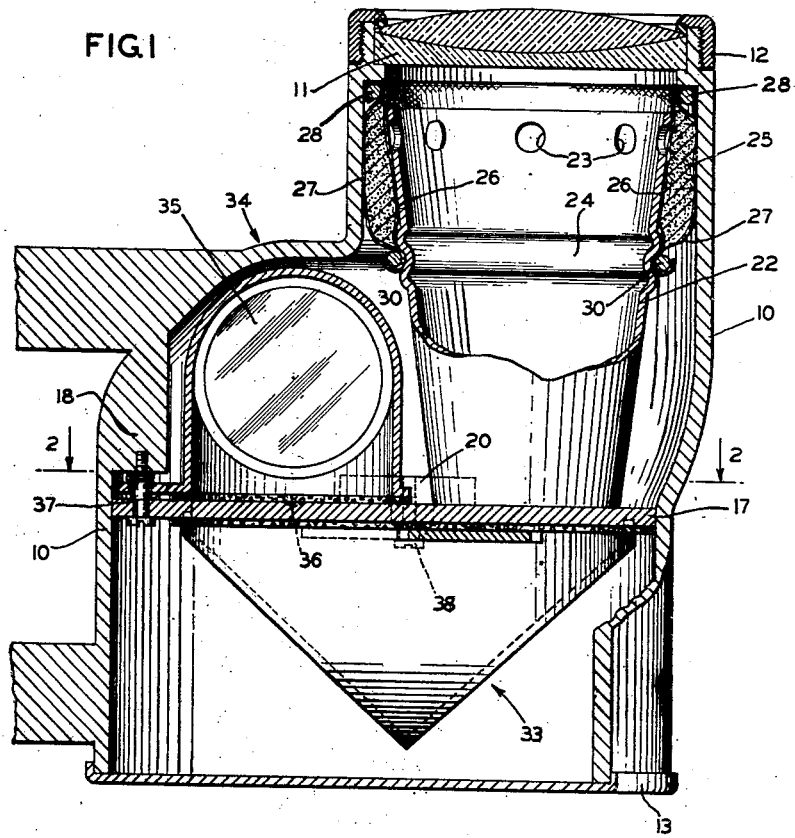
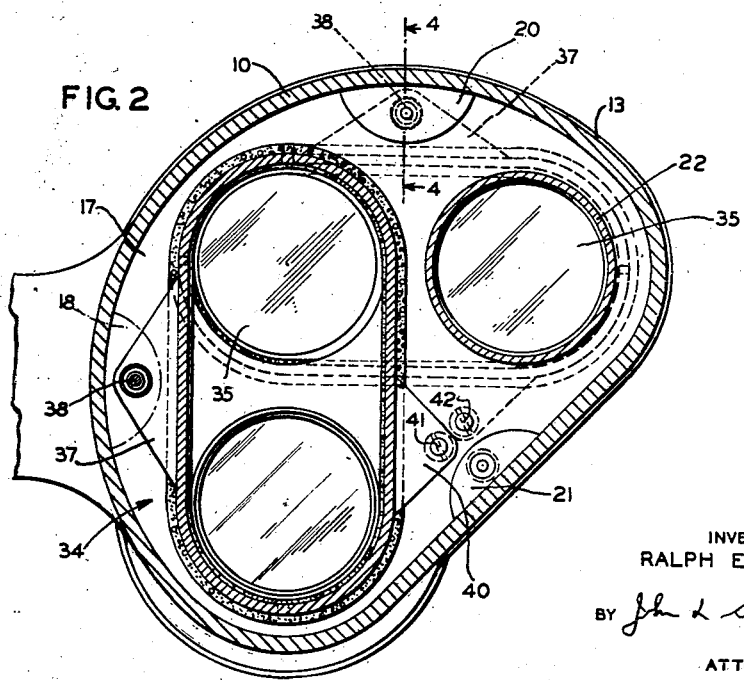
INVENTOR
RALPH E. BITNER
BY John L. Sterling
ATTORNEY July 6, 1943.  R. E. BITNER  2,323,787
REFLECTING LENS MOUNT
Filed Dec. 13, 1941  2 Sheets-Sheet 2

INVENTOR
RALPH E. BITNER
BY John L. Sterling
ATTORNEY

Patented July 6, 1943

2,323,787

UNITED STATES PATENT OFFICE 2,323,787

REFLECTING LENS MOUNT

Ralph E. Bitner, New York, N. Y., assignor to Remington Rand Inc., Buffalo, N. Y., a corporation of Delaware Application December 13, 1941, Serial No. 422,842

9 Claims. (Cl. 88—33)

This invention relates to binocular telescopes and particularly to structural design features for providing a dust free optical path.

The commercial prism binocular usually employs a sealed metal housing in which are mounted the reflecting prisms. However, the eyepiece lenses must be made movable to permit focusing and any continued eyepiece adjustment results in a pumping action which will change the air content within the enclosed housing and thereby introduce dirt and moisture to the inaccessible optical surfaces. The present design is an effort to reduce the evil effects of this pumping action and provide other structural changes which will improve the life and performance of the telescope.

The invention resides in an inside enclosure which includes the inner face of the objective, the four reflecting mirrors and the inner face of the field lens of the eyepiece. A sack of moisture absorbing material is placed at the entrance of this enclosure and structural means is provided to adjust the angular position of the reflecting units to achieve parallelism without admitting air into the enclosure. Focusing is performed by the adjustment of the eye lens of the eyepiece.

One of the objects of the present invention is to improve the structural design of a reflecting binocular to include an inner enclosure for the elimination of moisture and dirt from the interior optical surfaces.

Another object of the invention is to improve the design of the reflecting units so that they may be no larger than reflecting prisms of similar utility and have considerably less weight.

Another object of the invention is to incorporate a moisture absorbing substance between the internal enclosure and the external housing to keep moisture away from the optical surfaces.

Another object of the invention is to improve the adjustable means for aligning the reflecting surfaces so that adjustment may be made while observing a test object.

Other objects and structural details of the invention will be apparent from the following description when read in connection with the accompanying drawings, wherein Fig. 1 is a sectional view of one side of a reflecting binocular showing the two reflecting structures and the objective;

Fig. 2 is a sectional view taken along line 2—2 of Fig. 1 and shows the adjustable reflector mounting;

Figure 3:
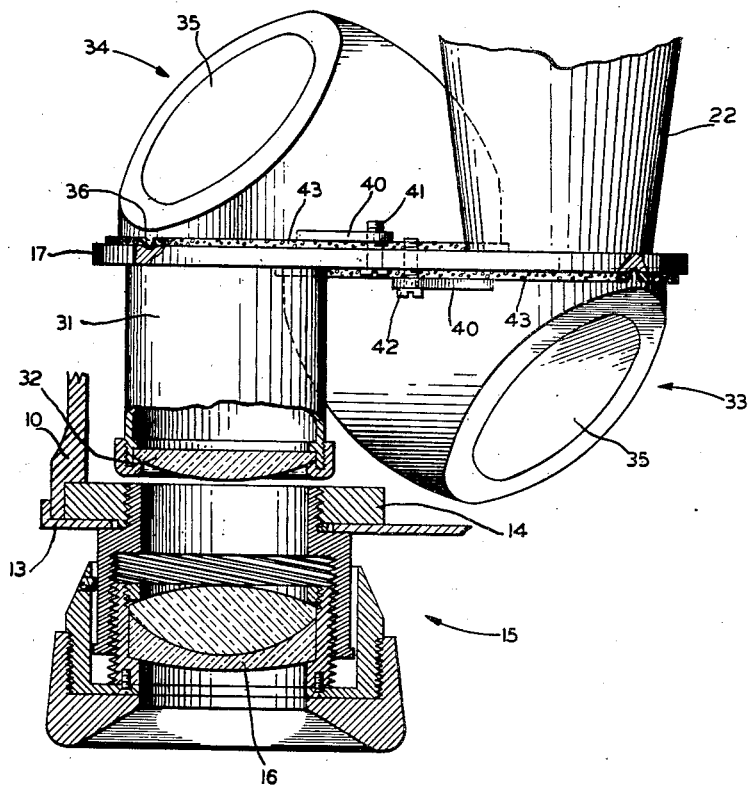
Fig. 3 is a side view of part of the inner enclosure with the eyepiece in section.
Figure 4:
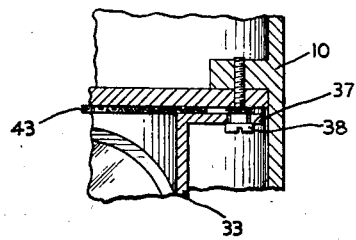
Fig. 4 is a sectional view taken along line 4—4 of Fig. 2 and shows the spring mounting of one of the reflecting units.

Referring now to Fig. 1, an outside housing 10 is employed, as usual, to act as a structural basis for mounting all the other components. A telescope objective lens 11 is mounted in the forward end of the housing and is held in place by a clamping ring 12. At the eyepiece end of the housing, a cover plate 13 of conventional design is employed to close the opening through which the reflector unit is assembled. An auxiliary mounting plate 14 (see Fig. 3) is secured adjoining the cover plate to hold a focusing mount 15 in which is clamped the ocular component 16 of the eyepiece.

The inner enclosure which includes mountings for the reflector units and the field lens is secured to a shelf 17 which fits snugly into the housing 10 and is bolted to three offset portions 18, 20, and 21 cast integral with the housing.

Three holes are cut in the shelf as indicated in Fig. 2 and into one of these a thin walled cone shaped tube 22 is secured. This tube extends almost to the objective 11 and near the end thereof contains a plurality of holes 23. About an inch from the objective end there is formed a series of annular corrugations 24.

In the intervening space between the inside of the housing and the outside of the tube 22 an annular sack 25 is positioned which contains a small quantity of moisture absorbing material such as calcium chloride or silica gel. The inner wall 26 of the sack is made of flannel or similar cloth, which will retain the absorbing material while at the same time allowing moisture to gradually work through from the enclosure. The outside wall 27 of the sack 25 is made of varnished cloth, which is air-tight under all normal conditions of variable atmospheric pressure. The objective edge of the sack is held against the inside wall of the housing 10 by a spring wire 28, while the other edge is held in contact with corrugations 24 of the tube 22 by a second spring wire 30.

In another hole in the shelf 17 a short cylindrical tube 31 is securely mounted (Fig. 3) and the field lens 32 of the eyepiece combination is mounted in the lower end of this tube by the usual retaining means.

Two reflecting units 33 and 34 are positioned over the remaining openings in a manner similar to the placing of the porroprisms in the well known prism binocular. Each reflecting unit consists of a thin-walled support on which two reflecting discs 35 may be mounted. These reflecting discs may be made of any suitable materials, the preferred type being glass with a reflecting film of sputtered aluminum or rhodium. The correct shape of these discs is an ellipse with the major axis equal to 1.414 times the minor axis. The discs 35 are mounted in such a manner as to form a hermetically sealed joint between the edges of the disc and the opening in the shell.

For the purpose of alignment, each shell is pivoted on two knife edges 36 (Figs. 1 and 3) which fit into slots in the shelf 17. One side of the shell is formed with a triangular plate 37, cast integral with the shell, and a spring and bolt combination 38 holds this plate resiliently stressed toward the shelf 17. On the other side of the shell, a similar triangular plate 40 is employed to positively position the shell in alignment and make the optical paths through the binocular parallel to each other. In order to make the aligning operation easy and convenient, two machine screws 41 and 42 are set with their heads directed toward the eye piece end of the instrument so that a screw driver may make the adjustment while looking through the telescope at a test object.

In order to make the enclosure air-tight at this point and still have a small degree of adjustment, gaskets 43 of sponge rubber are placed under the reflecting shells 33 and 34 and cemented in place when the instrument is first assembled.

As the light traverses the optical system, it first passes through the objective 11 and enters the inner enclosure. Then it is successively reflected by the four reflecting surfaces 35, all within the enclosure. On emerging, the light passes through the field lens of the eyepiece and is finally focused by the eye lens. It will be evident that all optical surfaces are either within the enclosure and protected by it or else in a position where they may be cleaned easily.

Under normal conditions there will be practically no flow of air into or out of the inner enclosure since the only reason for such movement resides in the small changes of atmospheric pressure which occur on the earth's surface. If the instrument is taken aloft in an airplane, however, the pressure change will be sufficient to cause a considerable volume of air to move out of the enclosure on going up and to move back again when returning to sea-level. For these conditions the outer sack fabric 27 may be made of air-pervious material, the same as the inner fabric 26 and the air is then permitted to move from the enclosure to the housing with little resistance.

It should be noted that on making a flight, the dry dust free air is first removed from the inner enclosure and moves to the intervening space between the enclosure and the housing. When landing this same dry air is drawn back into the enclosure along with a percentage of outside air which may contain both moisture and dust. As long as the passage of air into the enclosure must be through two flannel-like fabrics and a volume of moisture-absorbing powder, all the moisture and dust will be removed before this air makes contact with any of the optical surfaces.

It should be understood that any substance may be used in sack 25 if such substance has the ability to absorb and retain moisture. A large number of such chemicals are available.

While I have described what I consider to be highly desirable embodiments of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a reflecting telescope of the class described, a supporting housing, an enclosure within said housing comprising two cylindrical tubes and a quadruple reflecting assembly, an objective lens adjacent the open end of one of said tubes and a field lens of an eyepiece closing the open end of the second of said tubes, said first tube having one or more perforations in the walls thereof, a moisture-pervious fabric covering said perforations, and an anhydrous moisture absorbing material held in contact with said pervious fabric by a flexible non-pervious fabric.

2. In a reflecting telescope of the class described, a supporting housing, an enclosure within said housing comprising two cylindrical tubes and a reflecting assembly, an objective lens adjacent the open end of one of said tubes and a field lens of an eyepiece closing the open end of said second tube, said reflecting assembly comprising two adjustable shells, each of said shells supporting two reflecting discs, said first tube having one or more perforations in the walls thereof, a moisture-pervious fabric covering said perforations, and an anhydrous moisture absorbing material held in contact with said pervious fabric by a flexible non-pervious fabric.

3. In a reflecting telescope of the class described, a supporting housing, an enclosure within said housing comprising two cylindrical tubes and a quadruple reflecting assembly, an objective lens adjacent the open end of one of said tubes and a field lens of an eyepiece closing the open end of the second of said tubes, said enclosure having one or more openings in the walls thereof for equalizing pressure changes, a moisture-pervious fabric covering said openings, and an anhydrous moisture-absorbing material held in contact with said pervious fabric by a flexible non-pervious fabric.

4. In a reflecting telescope of the class described, a supporting housing, an enclosure within said housing comprising two cylindrical tubes and a reflecting assembly, an objective lens adjacent the open end of one of said tubes and one of the components of an eyepiece closing the open end of said second tube, said reflecting assembly comprising two adjustable shells, each of said shells supporting two reflecting discs, said enclosure having one or more openings in the walls thereof for equalizing pressure changes, a moisture-pervious fabric covering said openings, and an anhydrous moisture-absorbing material held in contact with said pervious fabric by a flexible non-pervious fabric.

5. In a reflecting telescope of the class described, a supporting housing, an enclosure within said housing comprising two cylindrical tubes and a quadruple reflecting assembly, an objective lens adjacent the open end of one of said tubes and a field lens of an eyepiece closing the open end of the second of said tubes, said first tube having one or more openings in the walls thereof, a container having walls of flexible fabric disposed about said first tube to cover said openings, an anhydrous moisture absorbing material within said container, and resilient mounting rings for holding said container in position, said container walls comprising a moisture-pervious fabric adjoining said openings and an impervious fabric opposite said pervious fabric.

6. In a reflecting telescope of the class described, a supporting housing, an enclosure within said housing comprising two cylindrical tubes a quadruple reflecting assembly, an objective lens adjacent the open end of one of said tubes and a field lens of an eyepiece closing the open end of the second of said tubes, said first tube having one or more perforations in the wall thereof, a moisture-pervious annular sack disposed about said first tube covering the perforations therein and an anhydrous moisture-absorbing material within said sack.

7. In a reflecting telescope of the class described, a supporting housing, an enclosure within said housing comprising two cylindrical tubes and a reflecting assembly, an objective lens adjacent the open end of one of said tubes and a field lens of an eyepiece closing the open end of said second tube, said reflecting assembly comprising two adjustable shells each of said shells supporting two reflecting discs, said first tube having one or more perforations in the walls thereof, a moisture-pervious annular sack disposed about said first tube covering the perforations therein and an anhydrous moisture-absorbing material within said sack.

8. In a reflecting telescope of the class described, a supporting housing, an enclosure within said housing comprising two cylindrical tubes and a reflecting assembly, an objective lens adjacent the open end of one of said tubes and one of the components of an eyepiece closing the open end of said second tube, said reflecting assembly comprising two adjustable shells, each of said shells supporting two reflecting discs, said enclosure having one or more openings in the walls thereof for equalizing pressure changes, a moisture-pervious annular sack disposed about said first tube covering the perforations therein and an anhydrous moisture-absorbing material within said sack.

9. In a reflecting telescope of the class described, a supporting housing, an enclosure within said housing comprising two cylindrical tubes and a quadruple reflecting assembly, an objective lens adjacent the open end of one of said tubes and a field lens of an eyepiece closing the open end of the second of said tubes, said first tube having one or more openings in the walls thereof, a container having walls of flexible airperious fabric disposed about said first tube to cover said openings, an anhydrous moisture-absorbing material within said container, and resilient mounting rings for holding said container in position.

RALPH E. BITNER.